United States Patent [19]

Carl

[11] 4,417,131
[45] Nov. 22, 1983

[54] ALTERNATIVE HEATING APPARATUS FOR USE IN A HEATING SYSTEM HAVING A FUEL BURNER, PARTICULARLY A FORCED-AIR CENTRAL HEATING SYSTEM

[75] Inventor: Douglas E. Carl, Burlington, Canada

[73] Assignee: Canada Thermofilm Limited, Concord, Canada

[21] Appl. No.: 193,848

[22] Filed: Oct. 3, 1980

[30] Foreign Application Priority Data

Oct. 12, 1979 [CA] Canada .................................. 337446

[51] Int. Cl.³ ............................ F24D 5/00; H05B 3/14
[52] U.S. Cl. .................................... 219/279; 219/375; 219/381; 219/374
[58] Field of Search ............... 219/279, 364; 237/2 A, 237/2 R

[56] References Cited

U.S. PATENT DOCUMENTS

| | | | |
|---|---|---|---|
| 2,893,639 | 7/1959 | Martin | 219/279 |
| 3,943,330 | 3/1976 | Pollock et al. | 219/374 |
| 3,994,276 | 11/1976 | Pulver | 219/279 |
| 4,141,408 | 2/1979 | Garnett | 219/279 |
| 4,151,398 | 4/1979 | Maake | 219/382 |
| 4,170,729 | 10/1979 | Lane et al. | 219/364 |

*Primary Examiner*—Bernard Roskoski
*Attorney, Agent, or Firm*—Remy J. VanOphem

[57] ABSTRACT

The invention consists of an electrical heating apparatus which provides for controlled fuel substitution in a heating system, particularly a forced-air central heating system. The electrical heater assembly is mounted in the system and a device is provided to select electricity as the heating fuel when off-peak periods in electricity demand occur. Since the cost of producing electrical energy during these off-peak periods is well known to be lower than during peak period times, the user of the invention will realize savings in total heating fuel costs through the substitution of electrical energy for the primary fuel, such as oil, wherever the off-peak price of electricity is sufficiently lower than the energy-equivalent price of the primary fuel. Where fossil fuels, principally oil, are used as the primary heating fuel, the invention will further act to conserve increasingly scarce and increasingly costly fuel supplies. Since the electrical heater is not used during peak demand periods, no increase in generating capacity is required for the invention to be utilized on a mass scale.

13 Claims, 8 Drawing Figures

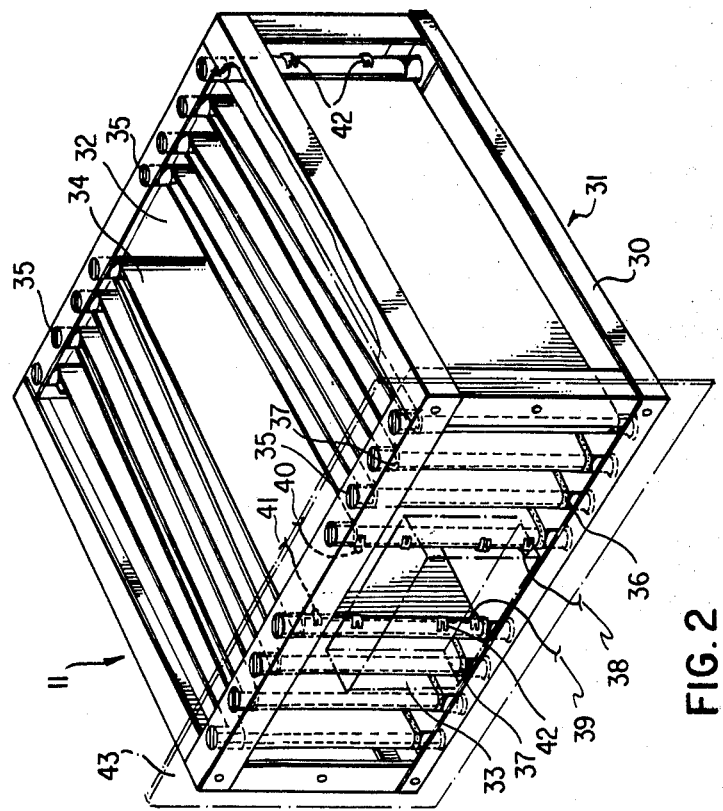
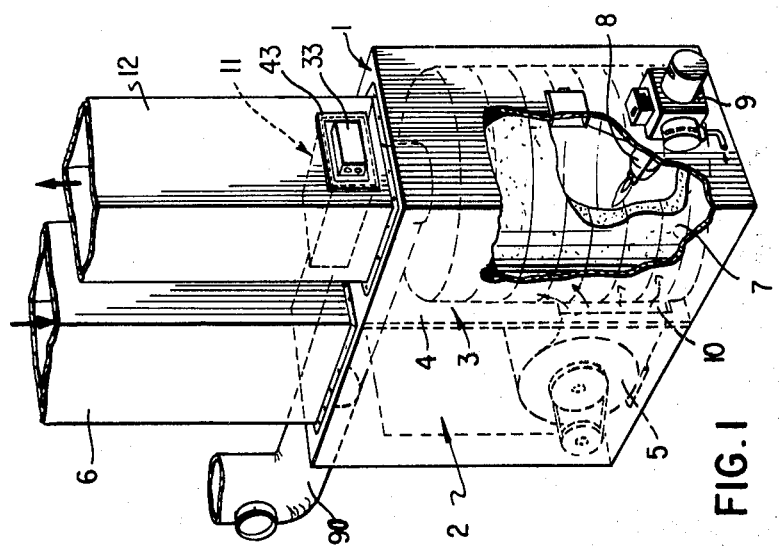
FIG. 2
FIG. 1

ALTERNATIVE HEATING APPARATUS FOR USE IN A HEATING SYSTEM HAVING A FUEL BURNER, PARTICULARLY A FORCED-AIR CENTRAL HEATING SYSTEM

The present invention relates to alternative heating apparatus for use in conjunction with, in general, a fuel burner in a forced-air central heating system.

A forced-air central heating system consists of a central furnace and duct work carrying warm air from the furnace to various outlets in the building and return air back to the furnace. Most furnaces comprise a refractory chamber around which the air passes and which contains a burner for burning a suitable fuel. A substantial proportion of fuel burning furnaces in North America are oil-fired, although natural gas and synthetic fuels are also used.

In North America, heating oil accounts for a substantial proportion of the total oil consumption. It would be neither feasible nor economic to convert existing oil burning installations to total electrical heating installations: not feasible because the user's electrical service would not generally be adequate and because existing electrical generating capacity would be unable to meet the load requirements during peak periods, particularly low temperature-related peak periods; and, not economic because the capital cost of total conversion to the user would not justify the investment, since the full savings would be zero or negative wherever the time-averaged electricity cost equals or exceeds the cost of oil, which condition currently prevails in major sectors of North America.

Electrical generating utilities experience a particular problem which is well known and which arises mainly as a result of the inability to provide an effective means of storing electricity. The demand for electricity varies considerably during the year and, even during the day. The utility must have sufficient generating capacity to meet the peak load demands and maintain an additional margin of safety commonly known as "spinning reserve". Although periods of peak load demand exist over as few as two hundred to three hundred hours per annum, or about 2.3 to 3.4% of total annual operating time, the generating capacity must nonetheless be adequate to meet them. This results in substantial costs for the utility company in terms of capital investment in physical plant and generation facilities. On the other hand, any additional load which improves the utility's annual load factor will result in lower total unit costs of producing electricity; that is, additional load which increases electrical energy sales at a rate greater than the corresponding requirement for increased generating capacity.

Accordingly the present invention provides a forced-air heating system comprising a main furnace, an outlet duct for conveying air from the furnace to a space to be heated, a blower for forcing air through the furnace, an auxiliary electric heater disposed so that air flowing through the main furnace flows thereover, first means responsive to inside air temperature, second means responsive to outside air temperature, and control means operable, when the inside air temperature is below a first predetermined level, to activate only said auxiliary electric heater if the outside air temperature is above a second predetermined level and only said main furnace if the outside air temperature is below said second predetermined level, said second predetermined level being selected taking into account electricity demand temperature dependency such that above said second predetermined temperature level electricity-demand is generally at an off-peak level.

Preferably, the housing is adapted to fit into the duct work of the central heating system immediately downstream of the furnace. Alternatively, the heating apparatus may be arranged in the duct work upstream of the furnace or in the furnace chamber themselves. The heating elements are preferably in the form of impregnated glass fiber panels sold under the registered trade mark "THERMOFILM". Such panels contain no wires and comprise a mixture of graphite and carbon, using polytetrafluoroethylene as a binder, which is sintered into special glass cloth to form an area register. Copper contact tapes or other contact means are applied along the edges of this area resistor to which a supply voltage may be applied.

The primary method of determining when the annual peak period, which generally consists of several hundred non-consecutive hours, occurs is to detect outside air temperature. In winter, if the outside air temperature during the daily peak period is above a certain value, say $-10°$ C., studies have shown that there is a lower probability that demand will exceed supply. In this case, the control means can be arranged to activate the heating elements such that the heating apparatus replaces the main burner of the furnace. When the room thermostat calls for heat, instead of the main burner being energized, the heating elements are energized to warm air flowing through the forced-air system. In addition, other ways of both defining and detecting off-peak periods can override the primary method. An alternative method is to detect planned reduction in utility company supply voltage. This controlled emergency voltage reduction will activate the sensing device and remove the electrical heating load by returning furnace operation to the primary fuel.

By using such alternative heating apparatus, it will be seen that the primary fuel, which will most likely be oil, will only be consumed during periods of heavy demand for electrical energy as defined by the electrical supply authority. Outside these periods, the alternative heating apparatus is used and this can enable a substantial reduction in the amount of oil or other primary fuel consumed. This is of obvious benefit in view of the rise in world oil prices and, particularly, from the long-term point of view of conserving oil which is a finite and non-renewable resource. Reduction in the amount of oil used for central heating purposes resulting from widespread use of the invention would lead to a significant reduction in the consumption of oil in North America.

In addition, the energy for the heating apparatus will come from the generating capacity of utility companies presently unused during off-peak periods. This will enable utility companies to even out their loads and produce electricity on a more cost-effective basis, since the generating system will operate closer to full capacity.

Since the heating apparatus is designed not to operate during peak periods of electricity demand, it will not be necessary to increase in capital costs to the utility companies. In effect, they will be producing more units of electricity from the equipment that they have at present. Of course, this would not be so if present oil fired furnaces were totally replaced by electric heaters. In that case, during peak periods, there would be a consequential increase in the peak loud demand leading to a requirement for increased capital investment. In relative terms, electricity would be at least as expensive to produce as it is now.

The invention will now be described in more detail, by way of example only, with reference to the accompanying drawings, in which:

FIG. 1 is a perspective view of a furnace including an alternative heating apparatus in accordance with the invention;

FIG. 2 is a perspective view showing such a heating apparatus;

Figure 3:
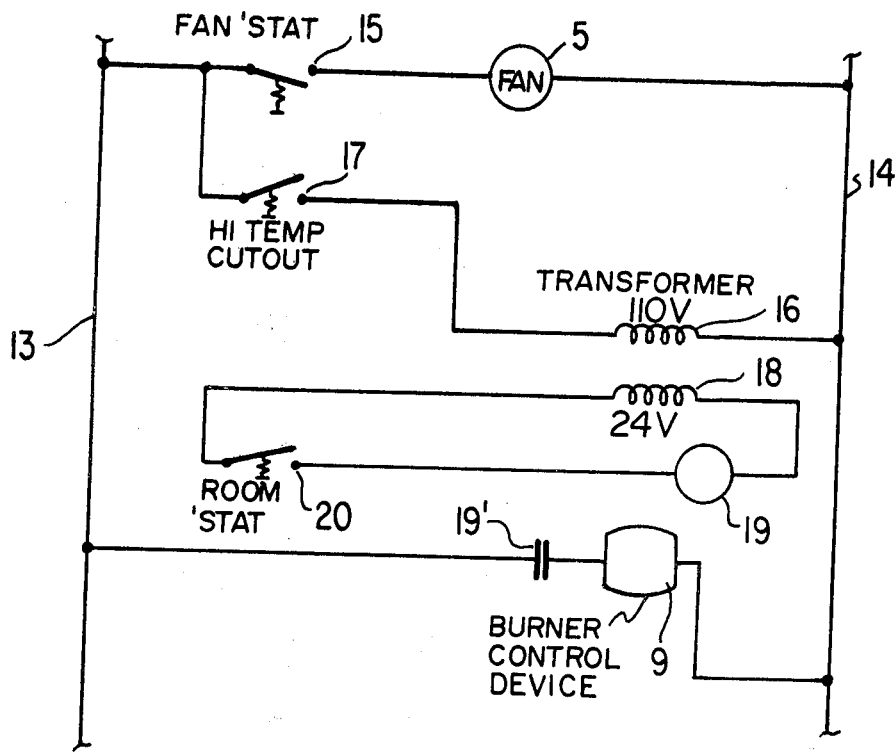
FIG. 3 is a circuit diagram showing a conventional furnace control circuit.

In FIG. 1, the central heating furnace comprises a main unit 1 divided into two chambers 2 and 3 by a central partition 4. A blower or fan 5 is provided in the bottom of the chamber 2 and draws air, through a filter (not shown), from an inlet duct 6 which provides a return air path from the building to be heated.

The chamber 3 contains a refractory pot 7 of fire bricks in which an oil burning burner 8 is arranged. A chimney 90 leads from the refractory pot 7 to expel combustion gases to the outside.

The burner 8 is controlled by a control device 9. During normal operation of the burner 8, the blower 5 blows air from the chamber 2 through an aperture 10 in the partition 4 into the chamber 3 where the air surrounds and flows over the refractory pot 7. From the chamber 3, the warmed air flows through an alternative heating apparatus 11 located in an outlet duct 12 which in turn is connected to the heating outlets throughout the building. The alternative heating apparatus 11 will be described in more detail later with reference to FIG. 2.

FIG. 3 shows a conventional furnace control circuit. In FIG. 3, the blower 5 is shown connected between main supply lines 13 and 14 via a normally open thermostat 15 which is responsive to the air temperature in the chamber 3. The primary winding of a transformer adapted to receive the 110 mains supply voltage is connected between the line 14 and the line 13 via a normally closed high temperature cut-out 17. The high temperature cut-out 17 is designed to operate when the temperature in the chamber 3 exceeds a predetermined level due, for example, to failure of the fan 5. Operation of the cut-out disconnects the supply voltage to the primary winding 16 of the transformer.

The secondary winding 18 of the transformer, which produces a 24 volt output, is connected in series with a relay winding 19 and a normally closed room thermostat 20. Below the desired room temperature, the series circuit is completed and the relay winding 19 is energized to close its associated relay contacts 19'. The relay contacts 19' are connected in series with the burner control device 9 between the supply lines 13 and 14. When the room thermostat 20 is closed and calls for heat, the relay winding 19 is energized thereby closing the associated contacts 19' to cause the burner control device 9 to fire the burner 8. This heats up the refractory pot 7. When the temperature in the chamber 3 reaches a certain level, the normally open thermostat 15 closes to activate the blower 5 and thereby blow air over the refractory pot 7 and out through the alternative heating apparatus 11 and the outlet duct 12. Similarly, when the room thermostat opens, as a result of the desired temperature being reached, the relay winding 19 is de-energized causing the associated contacts 19' to open. This causes the burner control device 9 to cut off the supply of fuel to the burner 8.

Accordingly, the refractory pot 7 cools dwn until the temperature is reached at which the lower thermostat 15 opens at which point the blower 5 turns off.

Figure 4:
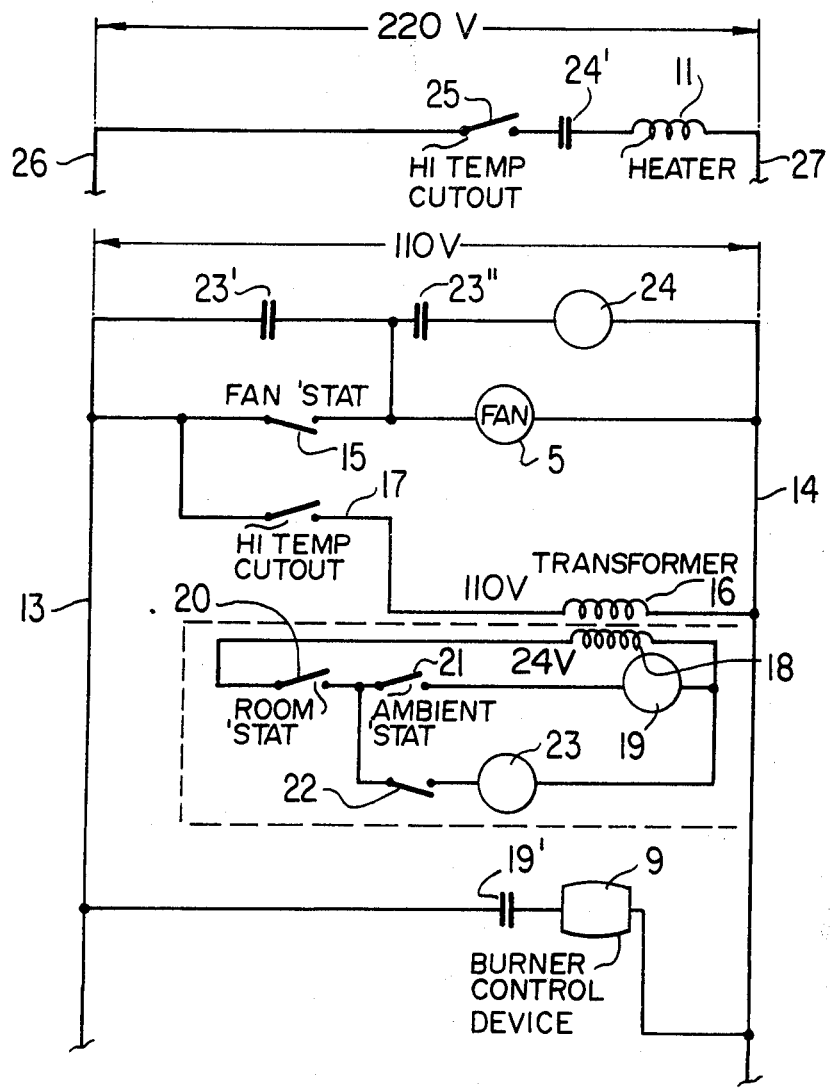
FIG. 4 is a diagram showing a control circuit for the heating apparatus.

FIG. 4 shows an embodiment of a control circuit for the furnace with the alternative heating unit 11. In the circuit of FIG. 4, components which are the same as those in FIG. 3 are given the same reference numerals. A thermostat is provided which is responsive to the ambient temperature outside the building. The thermostat has one normally closed contact 21 and one normally open contact 22. The normally closed contact 21 is in series with the room thermostat 20 and the relay winding 19. The normally open contact 22 is connected in series with a relay winding 23 having two contacts 23' and 23" and connected between the junction point of the room thermostat 20 and the contacts 21 and one end of the secondary winding 18 of the transformer. When the ambient temperature is below a preset value, say −10° C., the contacts 21 are closed and the contacts 22 are opened. Under these circumstances, the circuit operates in the same manner as the circuit described with reference to FIG. 3 and, when the room thermostat 20 calls for heat, the burner control device energizes the burner and subsequently the blower is started by the blower thermostat 15. When the ambient temperature outside the building is above the predetermined value, the contact 21 opens and the contact 22 closes. In this configuration, when the room thermostat 20 calls for heat, the relay winding 19 is not energized. Instead, the relay winding 23 is energized which in turn closes the contacts 23' and 23". These are connected in series with relay winding 24 between the 120 volt supply lines 13 and 14. Consequently, relay winding 24 is energized and the blower 5 is started. The alternative heating apparatus 11 is connected in series with relay contacts 24' and a normally closed high temperature cut-out 25 between 240 volt supply lines 26 and 27. Most houses in North America have in fact a 240 volt supply with a centre tap to provide 2-120 volt circuits.

Energizing of the relay winding 24 causes the associated contacts 24' to close and the heating apparatus 11 is switched on unless a predetermined temperature is exceeded, in which case the high temperature cut-out 25 is brought into operation. Thus, under these circumstances, when the room thermostat 20 calls for heat, the burner 7 is not fired but, instead, the alternative heating apparatus 11 is switched on. The air flowing out of the chamber 3 and through the alternative heating apparatus 11 is therefore warmed by electrical means as it passes through the apparatus 11 without consuming the primary fuel.

Figure 5:
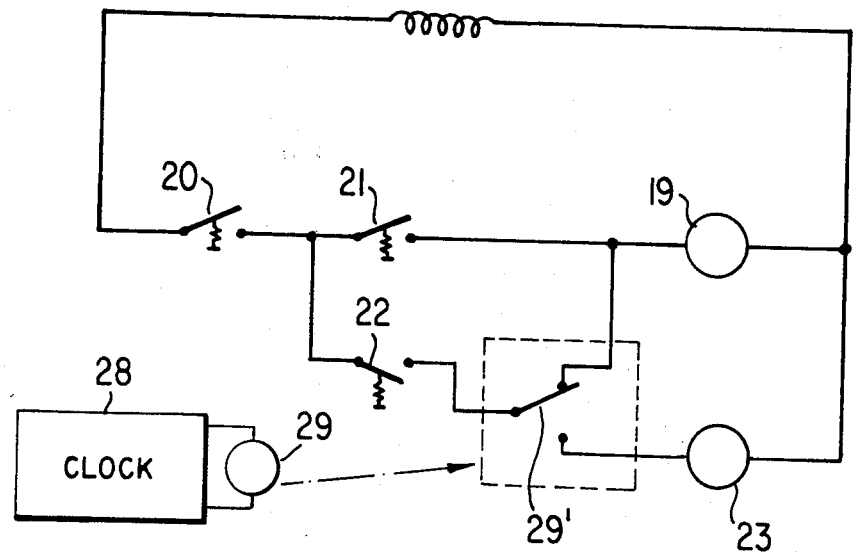
FIG. 5 shows a modified form of part of the circuit enclosed in dotted lines in FIG. 4.

It might however, for example, be desired to prevent the alternative heating apparatus being activated during certain times of day when it is known that demand is heavy for other reasons. FIG. 5 shows a modified form of the path of the circuit shown in FIG. 4 in dotted outlines. The normally open contact 22 of the ambient temperature thermostat is connected in series with a two-way contact 29' of a relay 29 energized by a clock 28. The clock 28 is arranged to activate the relay 29, thereby putting the contact into the position shown in FIG. 5, during times of day when it is not desired for the alternative heating apparatus to be brought into use. In that event, even if the outside temperature is above the predetermined value, and accordingly contact 21 is open whereas contact 22 is closed, the relay 19 is still energized through contact 22 and 29', instead of the relay 23. The relay 19 causes the main burner to operate. Outside those times of day, the contact 29' will be in the other position in which case when the contact 22 is closed the relay 23 is energized and thereby brings the alternative heating apparatus into operation.

As shown in FIG. 2, the alternative heating apparatus comprises a rectangular housing 30. The apparatus 11, as shown in FIG. 1, is arranged immediately downstream of the chamber 3. For this purpose an aperture is cut in the wall of the duct 12 which is sufficient to accommodate the housing 30. The housing 30 is inserted through the aperture to locate the heating element in the airstream within the duct and a flanged front cover plate 43 is secured to the wall of the duct 12 around the aperture. The bottom of the housing 30 forms an inlet port 31 and the top of the housing forms an outlet port 32. A control unit 33 containing the control circuitry associated with the heating apparatus 11 is mounted on the flanged front cover plate 43 of the housing 30.

Within the housing, in the vertical plane, are arranged a series of parallel vertical panels 34 of impregnated fiber glass cloth. For this purpose, a mixture of graphite and carbon using polytetrafluoroethylene as a binder is sintered into the cloth and copper contact tapes are applied along each edge thereof. Such impregnated cloth sold under the registered Trade Mark "Thermofilm". In the apparatus shown in FIG. 2, eight vertical insulating rods are arranged on opposite sides of the housing 30. A single strip of heating element of the type described extends in a meander path between opposite rods 35 of each group to form the panels 34. In this manner, in the example shown, two strips of heating element material form fourteen panels, although of course the number is unimportant particularly in view of the fact that the heating elements constitute an infinitely parallel resistor. The lower copper contact strips 36 and 37 of the heating elements can be seen in FIG. 2 connected to respective feed wires 38 and 39. Similarly, lead wires 40 and 41 are connected to the upper contact strips of the heating elements which are not shown in the drawings. The lead wires 40 and 41 are connected to the supply lines 30, whereas the lead wires 38 and 39 are together connected to the relay contact 24'. The ends of the element strips are mechanically held onto the insulating rods 35 by fastener clips 42.

In the example shown, the panels are impervious to air and the air flows between the panels. In an alternative arrangement, the heating elements can be made such that the fiber glass has an open-mesh structure but it otherwise similar manner to the Thermofilm TM. Although they retain their open-mesh structure, the panels treated in this way have similar resistive properties to panels made from a closed-mesh cloth. Such panels may be arranged in a stack with the air flowing transversely through them between the apertures formed by the open-mesh structure. Such an arrangement can lead to a more efficient heat transfer to the airstream.

The heating elements made from the Thermofilm TM cloth are particularly advantageous for use in the heating apparatus 11. They have a high surface area to mass ratio resulting in rapid heat production at the start of the heating cycle. They produce heat uniformly over a relatively large surface area, resulting in a high efficiency of heat transfer to the moving airstream. Additionally, they operate in the "black heat" range which permits the direct insertion of the heating elements in the furnace system without risk of their overheating or creating a fire hazard. However, other forms of element could be used in the apparatus such as, for example, finned rods of the type used in domestic base board heaters. Such elements may be Calrod (a trademark) type elements with or without heat dissipation fins attached. Other forms of element which may be used in the heating apparatus 11 include wire-wound elements, also with or without heat dissipation fins, expanded metal foil, carbon-filled tubes, and carbon-impregnated papers. Heat transfer to the moving air stream may take place either by direct or indirect contact.

In FIG. 1, the apparatus 11 is shown mounted in the duct work immediately downstream of the chamber 3 of the furnace. However, if desired, the apparatus 11 can be mounted actually inside the chamber 3 at a convenient location such that the air stream flows through it. The apparatus 11 could equally well be mounted in the chamber 2 which contains the fan 5, the important fact being that the air flowing through the furnace at some stage passes through the apparatus such that, in the alternative mode of operation where the electrical apparatus thus is being used as the heat source, the air is heated on passing therethrough. Indeed, if desired, to provide extra heat, an apparatus 11 could be mounted in each of the chambers 2 and 3 respectively or in each of the ducts 6 and 12 respectively.

Figure 6:
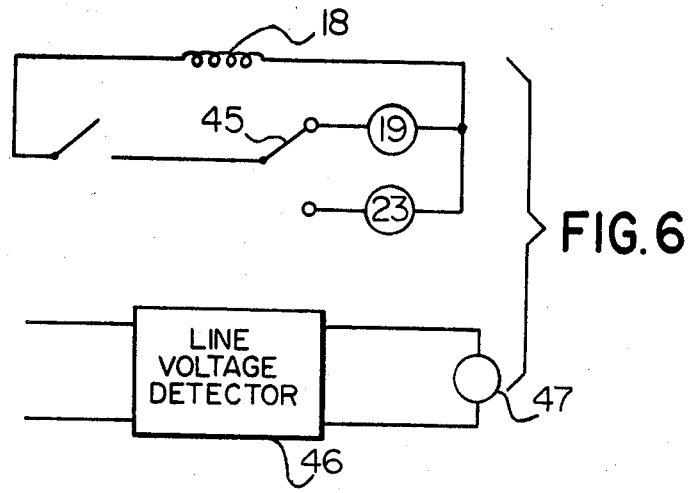
FIG. 6 shows a control device for detecting a controlled supply voltage reduction by the utility company.

In the described embodiment, an ambient temperature thermostat is used to determine when off-peak loads in electricity demand occur. Studies have shown that there is a good correlation between ambient temperature and electricity demands and the ambient temperature therefore provides a convenient means of determining when such off-peak loads occur. However, numerous other means of determining when off-peak loads and electricity demand occur can additionally be employed, subject to any utility's definition of off-peak periods for rate structure purposes. For example, during periods of heavy load when generating capacity is fully utilized, in order to reduce the demand on the generating system utility companies currently reduce the voltage of the supply system to maintain adequate contingency reserves. Another method, therefore, of determining when peak loads occur, and therefore, when the electrical heating apparatus 11 should not be in use, is to detect such voltage reductions. Purely by way of example, the contacts 21 and 22 shown in FIG. 4 could form part of a relay arranged such that, when supply conditions are normal, the contact 22 is closed whereas the contact 21 is open and, when the emergency voltage reduction is sensed, the contact 21 is closed and the contact 22 is opened. FIG. 6 shows an arrangement similar to this. Line voltage detector 46 activates a relay 47 which switches contact 45 between relay 19 and 23 depending on whether the supply voltage is above or below a predetermined value. The voltage reduction sensor could be used in conjunction with either or both of the ambient temperature thermostat and the clock shown in FIGS. 4 and 5. Indeed, it is believed that utility companies will continue to use controlled voltage reductions during system emergencies to reduce load.

Still further types of sensors may be used which are responsive to other factors shown to be related to electricity demands. For example, sensors responsive to wind velocity, solar radiation and rate of change of electrical frequency may be used to control the heating apparatus such that, at times during peak demand, the primary fuel burner is used to provide the source of heat for the system. A convenient control circuit may be provided in integrated logic form to provide any desired control according to the requirements of the local utility companies and conditions existing in any particular location.

Figure 7:
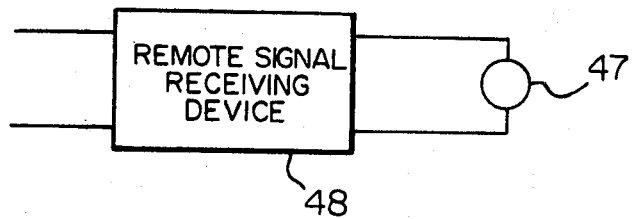
FIG. 7 shows a circuit for sensing a remotely transmitted signal.
Figure 8:
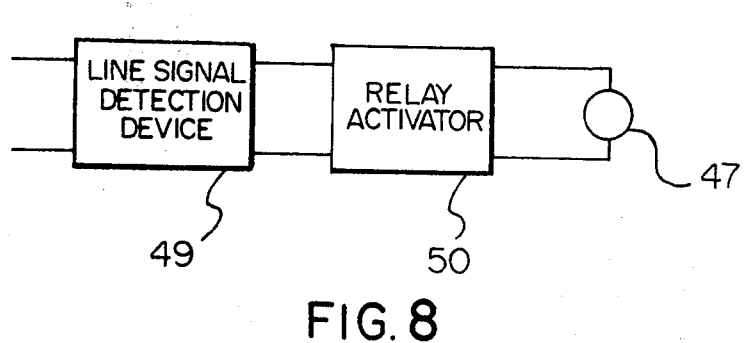
FIG. 8 shows a device for detecting a signal on the supply line.

If required, the heating apparatus 11 may otherwise be controlled directly and remotely by the utility companies. In this case the line voltage detector 47 of FIG. 6 may be replaced by a remote signal sensing device 48 as shown in FIG. 7. This activates the relay 47 which in turn switches over the contact 45 to change from one form of heating to another. This can be done either as described above or, alternatively, by a sensor detecting some other means of signalling such as, for example, superimposing a ripple signal on the main supply voltage. FIG. 8 shows such an arrangement. Device 49 detects a signal from the supply line and activates relay 47 by means of relay activator 50 to switch over contact 45 when it is desired to change from oil to electric heating.

There is a strong likelihood that, in the future, utility companies will introduce time of day rates for electricity with a view to distributing more evenly electricity demands. The electrical heating apparatus can then be controlled either by a clock shown in FIG. 5 or by utility company metering equipment, to be responsive to such differential rates and thereby minimize costs to the consumer. For example, the clock shown in FIG. 5 could be set such that the electrical heating apparatus 11 would normally operate during low rate periods unless, of course, the ambient temperature was below the predetermined level such that a heavy demand in electricity would nonetheless be present. A device could be provided with a manual switch to enable the consumer to switch on the electrical apparatus to take advantage of preferential rates or, alternatively, a programmable device could be used for this purpose. In any event, an over-ride may be provided to prevent operation of the electrical heating apparatus during peak demand periods which would be determined either by the ambient temperature thermostat or by some other means, such as remote signalling from the utility companies.

In the alternative arrangements described, it is important nonetheless to provide an interlocking relay to prevent both sources of fuel from operating simultaneously. Furthermore, it is important to provide some sort of relay to initiate the blower 5 immediately upon energization of the electrical heating elements since, normally, the blower only comes into operation when the air temperature in the heating chamber 3 reaches a certain temperature. Additionally, a temperature limiting switch should be located to interrupt the power supply to the heating elements in the event of blower failure or any other overheating condition in the same manner as the primary fuel burner is shut down if the blower 5 fails.

It will be appreciated that, instead of using a central heating apparatus 11, several similar smaller capacity heaters can be located remotely in individual air ducts or terminally at the air duct outlets.

The primary fuel for the burner may be oil, natural gas or any synthetic fuel, the important feature being that the primary fuel can be conserved during periods when spare generating capacity exists without increasing peak generating capacity.

The described alternative heating apparatus has the advantage that significant savings in scarce primary fuel can be attained. Because the alternative heating apparatus is only employed during off-peak periods of electricity demand, no increase in peak generating capacity is required and, consequently, no significant further investment in plant and equipment is required by the utility companies. They are, however, able to make more efficient use of their generating equipment by generating more units of electricity with existing equipment and thereby reduce the cost per unit of electrical energy. Thus, if the price for off-peak electricity is equal to the incremental cost of supplying that energy, the savings to the user of this invention will provide strong financial incentive for investment in the apparatus.

The embodiments of the invention in which an exclusive property or privilege is claimed are defined as follows:

1. A forced-air heating system comprising a main furnace, an outlet duct for conveying air from the furnace to a space to be heated, a blower for forcing air through the furnace, an auxiliary electric heater disposed so that air flowing through the main furnace flows thereover, first temperature responsive means responsive to inside air temperature, second temperature responsive means responsive to outside air temperature, and control means operable, when the inside air temperature is below a first predetermined level, to activate only said auxiliary electric heater if the outside air temperature is above a second predetermined level and only said main furnace if the outside air temperature is below said second predetermined level, said second predetermined level being selected taking into account electricity demand-temperature dependency such that above said second predetermined temperature level electricity demand is generally at an off-peak level wherein:

said auxiliary heater comprises a housing having opposed apertures forming an inlet and an outlet and defining a flow path therebetween, and a plurality of panels arranged to extend across said housing between said apertures and parallel to said flow path to define uninterrupted channels between said inlet and said outlet such that air flows between said panels directly from said inlet to said outlet without passing through said panels.

2. A forced-air heating system as claimed in claim 1, wherein the auxiliary electric heater is mounted in said outlet duct.

3. A forced-air heating system as claimed in claim 1, wherein said first and second means comprise first and second thermostats respectively which switch at said first and second predetermined levels.

4. A forced-air heating system as claimed in claim 3, wherein said second thermostat has a first contact in series with a circuit for activating the burner and a second contact in series with a circuit for activating said auxiliary heater, said second thermostat being arranged such that above said second predetermined temperature level said first contact opens and said second contact closes.

5. A forced-air heating system as claimed in claim 4, wherein said first and second contacts of said second thermostat are in series with a normally closed contact of the first thermostat, which is arranged such that when the inside temperature is below a first predetermined temperature level, either said main furnace or said auxiliary heater is activated according to whether the outside temperature is below said second mentioned predetermined temperature level as determined by said second thermostat.

6. A forced-air heating system as claimed in claim 4, wherein the second contact is in series with a relay which energizes said electrical heater and said blower.

7. A forced-air heating system as claimed in claim 6, further comprising means for overriding said second temperature responsive means during certain periods and activating said main furnace instead of the auxiliary heater when the inside temperature is below said first predetermined level and the outside temperature is above the second predetermined level during said certain periods.

8. A forced-air heating system as claimed in claim 7, wherein said overriding means comprises a clock operative to override said second temperature responsive means during predetermined periods of the day.

9. A forced-air heating system as claimed in claim 7, wherein said overriding means comprises means for detecting a voltage reduction.

10. A forced-air heating system as claimed in claim 7, wherein said overriding means comprises means for receiving signals transmitted from a remote location.

11. A forced-air heating system as claimed in claim 7, wherein said receiving means is adapted to detect signals impressed on the main supply voltage.

12. A forced-air heating system as claimed in claim 1, wherein said panels are formed by arranging a strip resistive material in a sinuous path between opposed insulating support members.

13. A forced-air heating system as claimed in claim 12, (any one of claim 34) wherein said panels are formed of a fiber sheet impregnated with a mixture of graphite and carbon to form an area resistor.

* * * * *

UNITED STATES PATENT AND TRADEMARK OFFICE
CERTIFICATE OF CORRECTION

PATENT NO. : 4,417,131

DATED : November 22, 1983

INVENTOR(S) : Douglas E. Carl

It is certified that error appears in the above-identified patent and that said Letters Patent is hereby corrected as shown below:

Column 1, before line 7, insert the following subtitle ---- BACKGROUND OF THE PRESENT INVENTION ----.

Column 1, before line 55, insert the following subtitle ---- SUMMARY OF THE PRESENT INVENTION ----.

Column 2, line 9, delete "chamber" and insert ---- chambers ----.

Column 2, line 68, delete "loud" and insert ---- load ----.

Column 3, before line 4, insert the following subtitle ---- BRIEF DESCRIPTION OF THE DRAWINGS ----.

Column 3, line 15, delete "and".

Column 3, before line 24, insert the following subtitle ---- DETAILED DESCRIPTION OF THE PREFERRED EMBODIMENT ----.

Column 3, line 55, delete "fan" and insert ---- blower ----.

Column 3, line 56, after "the", first occurrence, insert ---- high temperature ----. Same line, before "disconnects" insert ---- 17 ----.

UNITED STATES PATENT AND TRADEMARK OFFICE
CERTIFICATE OF CORRECTION

PATENT NO. : 4,417,131

DATED : November 22, 1983

INVENTOR(S) : Douglas E. Carl

It is certified that error appears in the above-identified patent and that said Letters Patent is hereby corrected as shown below:

Column 4, line 12, delete "dwn" and insert ---- down ----.

Column 4, line 43, after "with" insert ---- a ----.

Column 4, line 44, before "relay" insert ---- the ----.

Column 4, line 50, delete "centre" and insert ---- center ----.

Column 4, line 57, delete "7" and insert ---- 8 ----.

Column 4, line 64, after "apparatus" insert ---- 11 from ----.

Column 5, line 8, after "accordingly" insert ---- the normally closed ----.

Column 5, line 37, after "cloth" insert ---- is ----.

Column 5, line 53, delete "30". Same line, delete "lead" and insert ---- feed ----.

Column 5, line 59, after "arrangement," insert ---- shown in Fig. 6, ----.

UNITED STATES PATENT AND TRADEMARK OFFICE
CERTIFICATE OF CORRECTION

PATENT NO. : 4,417,131

DATED : November 22, 1983

INVENTOR(S) : Douglas E. Carl

It is certified that error appears in the above-identified patent and that said Letters Patent is hereby corrected as shown below:

Column 5, line 61, delete "it" and insert ---- is ----. Same line, before "manner" insert ---- in ----.

Column 6, line 13, delete "element" and insert ---- elements ----.

Column 6, line 15, delete "base board" and insert ---- baseboard ----.

Column 6, line 55, delete "electrical" and insert ---- alternative ----.

Column 7, line 20, delete "detector 47" and insert ---- detector 46 ----.

Column 8, line 16, delete "ment in plant and" and insert ---- ments in plants or ----.

In the Claims

Column 8, line 29, delete "the", and insert ---- said main ----.

Column 8, line 31, delete "the", and insert ---- said main ----.

Column 8, line 44, delete "temperature".

Column 8, line 60, after "second" insert ---- temperature responsive ----.

UNITED STATES PATENT AND TRADEMARK OFFICE
CERTIFICATE OF CORRECTION

PATENT NO. : 4,417,131

DATED : November 22, 1983

INVENTOR(S) : Douglas E. Carl

It is certified that error appears in the above-identified patent and that said Letters Patent is hereby corrected as shown below:

Column 9, line 15, delete "electrical" and insert ---- auxiliary electric ----.

Column 10, line 4, delete "overriding means" and insert ---- means for overriding ----.

Column 10, line 9, delete "overriding means" and insert ---- means for overriding ----.

Column 10, line 11, delete "overriding means" and insert ---- means for overriding ---.

Column 10, line 14, delete "receiving means" and insert ---- means for receiving signals ----.

Colunm 10, line 21, delete "(any one of claim 34)".

Signed and Sealed this

Fifth Day of February 1985

[SEAL]

Attest:

DONALD J. QUIGG

Attesting Officer     Acting Commissioner of Patents and Trademarks